United States Patent
Faresse

(10) Patent No.: US 12,530,936 B2
(45) Date of Patent: Jan. 20, 2026

(54) TRUSTED SEAMLESS AUTHENTICATION METHOD FOR ACCESS CONTROL

(71) Applicant: DORMAKABA SCHWEIZ AG, Rümlang (CH)

(72) Inventor: Marc Faresse, Châtonnaye (CH)

(73) Assignee: DORMAKABA SCHWEIZ AG, Wetzikon (AT)

(*) Notice: Subject to any disclaimer, the term of this patent is extended or adjusted under 35 U.S.C. 154(b) by 0 days.

(21) Appl. No.: 18/730,590

(22) PCT Filed: Sep. 1, 2022

(86) PCT No.: PCT/EP2022/074349
§ 371 (c)(1),
(2) Date: Jul. 19, 2024

(87) PCT Pub. No.: WO2023/138801
PCT Pub. Date: Jul. 27, 2023

(65) Prior Publication Data
US 2025/0140047 A1    May 1, 2025

(30) Foreign Application Priority Data
Jan. 21, 2022    (EP) ..................................... 22152718

(51) Int. Cl.
*G07C 9/25*    (2020.01)
*G06T 7/70*    (2017.01)
(Continued)

(52) U.S. Cl.
CPC ................ *G07C 9/257* (2020.01); *G06T 7/70* (2017.01); *G07C 9/00563* (2013.01); *G07C 9/28* (2020.01); *G07C 2209/64* (2013.01)

(58) Field of Classification Search
CPC ...... G07C 9/257; G07C 9/00563; G07C 9/28; G07C 2209/64; G07C 9/00309;
(Continued)

(56) References Cited

U.S. PATENT DOCUMENTS

| 8,108,904 | B1 * | 1/2012 | Chickering | ............. H04L 63/20 709/236 |
| 8,195,576 | B1 * | 6/2012 | Grigg | ................. G06Q 20/3278 726/10 |

(Continued)

FOREIGN PATENT DOCUMENTS

WO    2020161395 A1    8/2020

OTHER PUBLICATIONS

Australian Office Action for Application No. 2022435296, dated Aug. 1, 2024, 3 pages.
(Continued)

*Primary Examiner* — Aravind K Moorthy
(74) *Attorney, Agent, or Firm* — CANTOR COLBURN LLP

(57) ABSTRACT

An authentication method, in particular an access control method, for trusted seamless authentication, preferably for granting trusted seamless access to an asset, including the following steps: obtaining, by an authentication device, position data of at least one mobile device, the position data of the at least one mobile device being indicative for the position of the at least one mobile device relative to the authentication device; determining one of the at least one mobile device which is within a recording zone; recording, by the authentication device, biometric identification data of a carrier person of the determined mobile device; sending, by the authentication device, the recorded biometric identification data to the determined mobile device; receiving, in response to sending the recorded identification data, by the (Continued)

authentication device, authentication confirmation data and/or credential data from the determined mobile device.

13 Claims, 4 Drawing Sheets

(51) Int. Cl.
*G07C 9/00* (2020.01)
*G07C 9/28* (2020.01)

(58) Field of Classification Search
CPC .... G06T 7/70; G06F 21/35; G06F 2221/2111; G06F 2221/2113; G06F 21/32; H04L 63/08; H04L 63/10; H04W 12/06; H04W 12/64
See application file for complete search history.

(56) References Cited

U.S. PATENT DOCUMENTS

| | | | | |
|---|---|---|---|---|
| 8,738,925 B1* | 5/2014 | Park | H04B 7/26 | 713/186 |
| 9,084,217 B2* | 7/2015 | Wax | H04W 64/00 | |
| 9,965,728 B2* | 5/2018 | Perold | H04W 4/02 | |
| 10,206,099 B1* | 2/2019 | Trinh | H04W 4/021 | |
| 10,219,157 B1* | 2/2019 | Jiang | H04L 63/062 | |
| 10,299,077 B1* | 5/2019 | Liu | H04W 24/08 | |
| 10,706,422 B2* | 7/2020 | Douglas | G06Q 20/02 | |
| 10,764,294 B1* | 9/2020 | Wasiq | H04L 63/10 | |
| 10,789,347 B1* | 9/2020 | Song | H04W 4/08 | |
| 10,820,137 B1* | 10/2020 | Newstadt | H04W 4/33 | |
| 11,146,944 B1* | 10/2021 | Guru | H04W 4/50 | |
| 12,217,240 B1* | 2/2025 | Chaudhri | G06Q 20/18 | |
| 2008/0184355 A1* | 7/2008 | Walrath | H04L 9/32 | 726/5 |
| 2009/0043896 A1* | 2/2009 | Law | H04L 65/60 | 709/228 |
| 2009/0061895 A1* | 3/2009 | Vasa | H04L 67/52 | 455/456.2 |
| 2010/0001832 A1* | 1/2010 | Langille | H04N 21/4627 | 340/5.83 |
| 2010/0073127 A1* | 3/2010 | Fukushima | G06F 21/35 | 713/168 |
| 2011/0047603 A1* | 2/2011 | Gordon | H04L 63/0823 | 726/5 |
| 2011/0219229 A1* | 9/2011 | Cholas | H04L 9/32 | 713/168 |
| 2011/0252237 A1* | 10/2011 | PalChaudhuri | H04L 63/10 | 713/168 |
| 2012/0268241 A1* | 10/2012 | Hanna | G06F 21/32 | 340/5.52 |
| 2013/0165075 A1* | 6/2013 | Rishy-Maharaj | H04W 12/04 | 455/411 |
| 2013/0205377 A1* | 8/2013 | Cheng | H04L 67/306 | 726/7 |
| 2013/0219178 A1* | 8/2013 | Xiques | H04L 65/70 | 713/168 |
| 2013/0227664 A1* | 8/2013 | McKay | H04L 9/3231 | 726/7 |
| 2013/0278414 A1* | 10/2013 | Sprigg | A61B 5/746 | 340/539.12 |
| 2013/0295962 A1* | 11/2013 | Manroa | H04W 64/00 | 455/456.6 |
| 2014/0062774 A1* | 3/2014 | Hale | G01S 19/48 | 342/357.31 |
| 2014/0106710 A1* | 4/2014 | Rodriguez | H04W 4/12 | 455/411 |
| 2014/0118520 A1* | 5/2014 | Slaby | G06V 40/50 | 340/5.52 |
| 2014/0171114 A1* | 6/2014 | Marti | G01S 5/017 | 455/456.2 |
| 2014/0214616 A1* | 7/2014 | Major | G06Q 30/0623 | 705/26.61 |
| 2015/0111534 A1* | 4/2015 | Grayson | H04M 3/4931 | 455/414.3 |
| 2015/0156529 A1* | 6/2015 | Peterson | H04N 21/6582 | 725/12 |
| 2015/0249913 A1* | 9/2015 | Hua | H04W 12/50 | 455/41.2 |
| 2015/0326613 A1* | 11/2015 | Devarajan | H04L 63/20 | 726/1 |
| 2015/0348025 A1* | 12/2015 | Brown | G06Q 20/367 | 705/41 |
| 2016/0036810 A1* | 2/2016 | Kim | H04L 67/60 | 726/7 |
| 2016/0087977 A1* | 3/2016 | Durkan | G06F 21/32 | 726/6 |
| 2016/0132890 A1* | 5/2016 | Banerjee | G06Q 20/4014 | 705/44 |
| 2016/0285938 A1* | 9/2016 | Rider | H04L 65/762 | |
| 2017/0034142 A1* | 2/2017 | Camenisch | H04L 9/3268 | |
| 2017/0147360 A1* | 5/2017 | Reunamaki | H04L 41/0809 | |
| 2017/0163637 A1* | 6/2017 | Peterson | H04L 63/04 | |
| 2017/0243128 A1* | 8/2017 | Kishan | G06F 9/5094 | |
| 2017/0347388 A1* | 11/2017 | Cai | H04W 76/15 | |
| 2017/0352068 A1* | 12/2017 | Dominguez | H04W 8/005 | |
| 2017/0353448 A1* | 12/2017 | Sarin | H04W 4/02 | |
| 2017/0353454 A1* | 12/2017 | Cooper | H04L 63/10 | |
| 2018/0007059 A1* | 1/2018 | Innes | G06F 21/6218 | |
| 2018/0108020 A1* | 4/2018 | Thatte | H04L 9/0866 | |
| 2018/0131696 A1* | 5/2018 | Wade | G06F 21/40 | |
| 2018/0199021 A1* | 7/2018 | Herschman | H04N 21/435 | |
| 2018/0288041 A1* | 10/2018 | Zavesky | H04L 9/3231 | |
| 2018/0314817 A1* | 11/2018 | Gadde | G06F 21/6218 | |
| 2018/0322248 A1* | 11/2018 | Alisuag | G16H 40/67 | |
| 2019/0042071 A1* | 2/2019 | Gandhi | H04W 4/185 | |
| 2019/0097803 A1* | 3/2019 | Vlugt | H04W 12/02 | |
| 2019/0187265 A1* | 6/2019 | Barbello | G06F 18/22 | |
| 2019/0207931 A1* | 7/2019 | Alameh | H04W 12/08 | |
| 2019/0297398 A1* | 9/2019 | Burton | H04B 5/72 | |
| 2019/0319951 A1* | 10/2019 | West, III | H04L 63/0876 | |
| 2020/0004970 A1* | 1/2020 | Wang | H04L 63/0876 | |
| 2020/0019678 A1* | 1/2020 | Kunnath | G06F 21/41 | |
| 2020/0045042 A1* | 2/2020 | Peng | A63B 24/0059 | |
| 2020/0052896 A1* | 2/2020 | Acharya | H04L 9/3213 | |
| 2020/0162899 A1* | 5/2020 | Brandes | H04W 12/64 | |
| 2020/0168017 A1* | 5/2020 | Prostko | G01S 13/886 | |
| 2020/0180592 A1* | 6/2020 | Tanoue | H01M 8/04029 | |
| 2020/0184191 A1* | 6/2020 | Thompson | G06V 40/1365 | |
| 2020/0193335 A1* | 6/2020 | Sekhar | G06Q 10/025 | |
| 2020/0244670 A1* | 7/2020 | Mullins | H04W 12/63 | |
| 2020/0267553 A1* | 8/2020 | Wagner | G06F 21/32 | |
| 2020/0279269 A1* | 9/2020 | Wagner | G06Q 20/3829 | |
| 2020/0342129 A1* | 10/2020 | Chaiken | G06F 21/602 | |
| 2020/0366685 A1* | 11/2020 | Ullrich | G16H 40/40 | |
| 2021/0014233 A1* | 1/2021 | Kuppannan | H04L 63/0209 | |
| 2021/0026940 A1 | 1/2021 | Zhou et al. | | |
| 2021/0097257 A1* | 4/2021 | Gupta | G06V 40/13 | |
| 2021/0105619 A1* | 4/2021 | Kashani | G10L 15/25 | |
| 2021/0112411 A1* | 4/2021 | Pazhyannur | H04W 12/06 | |
| 2021/0133749 A1* | 5/2021 | Hefetz | G06Q 20/322 | |
| 2021/0185533 A1* | 6/2021 | Ficara | H04W 8/005 | |
| 2021/0286864 A1* | 9/2021 | Burke | G06F 21/32 | |
| 2021/0304211 A1* | 9/2021 | Goda | G06Q 20/3823 | |
| 2021/0326424 A1 | 10/2021 | Einberg et al. | | |
| 2021/0359842 A1* | 11/2021 | Pillai | H04L 63/0823 | |
| 2021/0390810 A1 | 12/2021 | Kuenzi et al. | | |
| 2021/0400432 A1* | 12/2021 | Ivanov | H04W 4/024 | |
| 2022/0012326 A1* | 1/2022 | Ratnakaram | G06F 21/44 | |
| 2022/0104015 A1* | 3/2022 | McDevitt | H04N 21/6547 | |
| 2022/0108322 A1* | 4/2022 | Cao | G06Q 20/206 | |
| 2022/0141510 A1* | 5/2022 | Krishnamoorthi | H04N 21/4524 | 709/231 |
| 2022/0160309 A1* | 5/2022 | Poltorak | A61B 5/7264 | |
| 2022/0247762 A1* | 8/2022 | Jasleen | H04L 63/20 | |
| 2022/0300973 A1* | 9/2022 | Walters | G06Q 20/409 | |
| 2023/0006861 A1* | 1/2023 | Hughes | H04L 12/10 | |
| 2023/0048931 A1* | 2/2023 | Istomin | H04L 63/105 | |
| 2023/0213637 A1* | 7/2023 | Brown | G01S 13/346 | |

(56) References Cited

U.S. PATENT DOCUMENTS

OTHER PUBLICATIONS

International Search Report and Written Opinion for Application No. PCT/EP2022/074349, dated Nov. 21, 2022, 14 pages.

* cited by examiner

TRUSTED SEAMLESS AUTHENTICATION METHOD FOR ACCESS CONTROL

CROSS-REFERENCE TO RELATED APPLICATIONS

This application is a 35 U.S.C. § 371 National Stage patent application of PCT/EP2022/074349 filed 1 Sep. 2022, which claims the benefit of European patent application 22152718.7 filed 21 Jan. 2022, the disclosures of which are incorporated herein by reference in their entirety.

TECHNICAL FIELD

The present disclosure generally concerns the field of electronic authentication methods, in particular authentication methods for access control, and more particular trusted seamless authentication methods for granting access to an asset.

BACKGROUND

Authentication methods have become widely used in various applications ranging from mobile payment and governmental administrative requests to access control. For those applications, authentication via pin codes or electronic credentials are widely used. For example, in the field of mobile access, it is common that a credential is sent by a mobile device to an authentication device, wherein the authentication device verifies that the received credential matches to a whitelist of credentials in order to grant access based on the verification of the credential.

One problem that ordinary authentication methods have is that access is granted to a person who has the credential. However, there is usually no verification that the person in fact owns the credential legitimately. Existing approaches, for example in the area of multi-factor authentication, try to solve the problem, but they lead to a reduction in usability. Furthermore, depending on the type of personal data used for such verification, there is a significant data protection problem.

SUMMARY

The present disclosure provides an authentication method which provides a high usability and at the same time a high security level in terms of data protection and/or authentication legitimacy. Further, the present disclosure provides a respective authentication device and a respective computer program.

According to the present disclosure, the above-mentioned advantage is addressed by providing the features of the independent claims. In addition, further advantageous embodiments follow from the dependent claims and the description.

According to a first aspect, the present disclosure provides an authentication method, in particular an access control method, for trusted seamless authentication, preferably for granting trusted seamless access to an asset, wherein the method comprises different steps as follows: The method comprises obtaining, by an authentication device, position data of at least one mobile device, the position data of the at least one mobile device being indicative for the position of the at least one mobile device relative to the authentication device. The method further comprises determining one of the at least one mobile device which is within a recording zone. Further, the method comprises recording, by the authentication device, biometric identification data of a carrier person of the determined mobile device. The method further comprises sending, by the authentication device, the recorded biometric identification data to the determined mobile device. Further, the method comprises receiving, in response to sending the recorded identification data, by the authentication device, authentication confirmation data and/or credential data from the determined mobile device.

Generally, in the field of biometrics-based authentication, there are various issues, especially concerning data security and usability. The herein disclosed method guarantees users a high data privacy level and at the same time offers improved usability. Details are described in the following.

The authentication device may in particular be an access control reader which is mounted near an access portal to control respective access. The access portal may for example be a door inside a building or may be a main entrance door of a building.

The mobile device may in particular be a smartphone of a carrier person being configured to be used by its respective carrier person to gain access. The carrier person may be an individual who is the owner of the mobile device or who is an individual to whom the mobile device is assigned, for example an employee whose employer has assigned him or her the mobile device. In the following, the terms carrier, carrier person, user, and owner are partially used as synonyms and the skilled person understands the underlying contexts.

The recording zone may be provided to be in the near environment of the authentication device. For example, the recording zone may be a semicircular area on one side of an access portal near which the authentication device is mounted. In particular, the recording zone may be a zone in which the authentication device is capable of recording position data of persons and/or biometric authentication data of a carrier person, for example through a camera.

It may be provided in the step of determining one of the at least one mobile device which is within a recording zone that the determination of the one mobile device is carried out according to the following rule: Determine the mobile device out of the at least one mobile devices that is spatially closest to the authentication device. In other words, in a situation where several mobile devices are in the recording zone, the one with the smallest spatial distance to the reader is determined to be the one mobile device. Of course, the recording zone may be defined to be as small such that only a predefined number of persons in able to be in inside the recording zone.

Biometric identification or authentication using mobile devices is a widely used approach. Modern mobile devices offer various options for biometric identification to increase the user's convenience, especially by replacing common passwords that require relatively complex input. A biometric identification may be based on standard sensors of a mobile device. The most widely used methods are fingerprint recognition, facial recognition, in particular including iris recognition, speaker recognition or a combination thereof. Modern mobile devices have the appropriate sensors for biometric identification, such as fingerprint sensors, high-resolution camera systems or microphones. Biometric characteristics of a user, who is in particular the owner of the mobile device, can thus be easily captured by the mobile device and stored in encrypted form as a template in a local memory of the mobile device. If biometric identification is required at a later time, for example when using a function of the mobile device, the respective biometric characteristic (for example the fingerprint) is captured at runtime and compared with the previously stored template. In this way, it is determined whether the person who wants to use the said function of the mobile device is really authorized to do so.

As disclosed herein, the recording of the biometric identification data according to the present disclosure is carried out by the authentication device and sent to the mobile device. In other words: Sensors of the authentication device are used to record biometric characteristics, wherein the recorded biometric characteristics are sent to the mobile device for comparing them to the respective template. The sensors of the mobile device are not used at runtime. The particular advantage of this is that the user does not have to actively interact with the mobile device and, in particular, does not have to take it out of his pocket to identify himself biometrically. Therefore, the authentication process is configured to be seamless, as described in the following.

As an additional or inherent part of recording the biometric identification data, an anti-spoofing check may be provided. In particular, the camera may check whether the captured biometric identification data originates from a living person. This particular security-enhancing feature is described further at a later stage below, for example with respect to face recognition, iris recognition, fingerprint recognition, vein recognition, voice recognition and the like.

The respective determined mobile device may, after receiving the recorded biometric identification data from the authentication device, compare the received biometric identification data to respective biometric templates as described above. The biometric templates may representations of biometric characteristics of the carrier person, which were recorded by the mobile device in advance and stored locally on the mobile device. Alternatively, the biometric templates may be stored on a server, wherein in mobile device communicates with the server in order to compare the received biometric identification data with the biometric templates. It is preferred that the biometric templates are stored in an encrypted manner. Advantageously, the recorded biometric identification data is encrypted by the authentication device prior to sending the data to the mobile device. In the case described above, where the biometric identification data is sent through an advertising signal, encryption is particularly advantageous in terms of data protection.

After comparing the received biometric identification data and the biometric template, the mobile device may determine that the comparison was successful and that the received biometric identification data sufficiently match the templates. In that case, the mobile device sends out either an authentication confirmation data and/or credential data to the authentication device through wireless communication.

Authentication confirmation data can be considered as a data package that includes information about a performed and successful verification of biometric identification data as described above. Optionally, authentication confirmation data may additionally include metadata, such as the type of mobile device, the time of the verification or similar. Credential data can be regarded as a data packet representing an access right. This includes in particular all common types of credential data used in the field of access control.

Whether the mobile device sends authentication confirmation data or credential data to the reader at runtime depends on a security level, which may be predefined.

According to a first security level, the mobile device may only send authentication confirmation data to the authentication device. In this case, the decision about access is made in the mobile device. The authentication device can immediately trigger further logical steps, such as unlocking a lock, on the basis of the authentication confirmation data.

According to a second security level, the mobile device can send only credential data to the authentication device. In this case, the decision on access is made in the authentication device. The authentication device can compare the received credential data in particular with permissible credential data to which the authentication device has access. In particular, the permissible credential data can be stored on the authentication device in the form of a whitelist. Alternatively or additionally, the permissible credential data can be stored on a server with which the authentication device communicates.

According to a third security level, the mobile device can transmit authentication confirmation data together with credential data to the authentication device. In this case, too, the decision on access can be made by the authentication device on the basis of the credential data, as in the case of the second security level. The authentication confirmation data can also be stored in the authentication device or on a server with which the authentication device communicates, in order to be able to check later that biometric identification data has been verified. In this case, the authentication confirmation data may include additional metadata, such as the type of mobile device or the time of verification or the type of biometric identification data.

A particular advantage of the disclosed method is that biometric templates, as described above, do not need to be distributed systemically, but only need to be present on the mobile device. In other words, there is no need for biometric data representing sensitive data about individuals to be stored on different authentication devices or on a third-party managed server. This significantly increases data security. Individuals who undergo or are required to undergo access control thus always remain in charge of their sensitive biometric data. Biometric data does not have to be managed by a third party and remains within the control of the person to whom it belongs.

Furthermore, it is not necessary to interact with the mobile device to gain access. Figuratively speaking, a user does not have to take the mobile device out of his pocket at runtime, but can leave it in his pocket. This creates a seamless access process that nevertheless offers a high level of security through biometric authentication. In particular, the use of biometrical authentication ensures the identity of the person seeking access and protects an asset from unauthorized entry.

According to the present disclosure, it may be provided that, in addition to obtaining position data of at least one mobile device, the method further comprises:
  obtaining, by the authentication device, position data of at least one person, preferably using at least one optical sensor which may be a camera, the position data of the at least one person being indicative for the position of the at least one person relative to the authentication device.
  correlating of the position data of the at least one mobile device and the position data of the at least one person and determining that the at least one person is a carrier person of the at least one mobile device.

It is particularly advantageous for the method disclosed herein to match a mobile device and its carrier person with a reasonable probability in order to prevent that recognized biometric authentication data is sent to a different mobile device which is not the mobile device of the carrier person. The term correlating may be understood as to be a matching a mobile device and its carrier person.

Assuming the configuration described above, matching may be performed by sensing the position of the mobile device, in particular using wireless technologies as described further below, and by sensing the position of the carrier person, for example by making an assumption at runtime when the biometric identification data of the carrier person is sensed, and/or by image data from a camera. The aforementioned assumption at runtime, when the biometric identification data of the carrier person are captured, can consist, for example, in the assumption that when a fingerprint is captured on the authentication device, the spatially closest mobile device is assumed to belong to the carrier person who has his finger scanned by the authentication device at runtime. The aforementioned matching through image data may on the other hand be carried out more precisely, if the specific position of the carrier person is tracked via camera tracking, in particular using depth cameras, wherein the position of the mobile device and the position of the carrier person is matched together.

As an alternative to matching the mobile device and the respective carrier person, it is also possible to send the biometric identification data by means of an advertising signal to all mobile devices which are in the recording zone. This reduces the complexity of the process, although—even if the biometric data is encrypted beforehand by the authentication device—data protection is adversely reduced.

Further, the authentication method of the present disclosure may comprise deleting, by the authentication device, the recorded identification data after sending the recorded identification data to the determined mobile device.

Providing a deletion step ensures that no sensitive biometric data remains on the authentication device and that captured biometric data is only used at runtime for the intended purpose. This further increases data security.

According to embodiments of the present disclosure, it may be provided that obtaining position data of at least one mobile device is performed by means of Ultra-Wideband transmissions and/or by means of Bluetooth transmissions and/or by means of Wireless-LAN transmissions and/or by means of GPS data provided by the at least one mobile device and/or by means of geomagnetic indoor positioning data provided by the at least one mobile device.

It is particularly advantageous to use Ultra-Wideband communication for the purpose of obtaining position data of the mobile device and preferably also for all other data exchanges between the respective mobile device and the authentication device since Ultra-Wideband provides an easy way of ranging though the determination of Time-of-Flight and Angle-of-Arrival. Further, Ultra-Wideband is capable of transferring data packages of various sizes efficiently.

The method of the present disclosure may provide that recording biometric identification data of a carrier person of the determined mobile device comprises recording sensor data, wherein the sensor data is preferably of a type which may be also recorded and stored by a smartphone by default, in particular:

recording a fingerprint via a fingerprint sensor of the authentication device, wherein preferably an anti-spoofing check of the recorded biometric identification data is performed, by an anti-spoofing-engine of the authentication device or of the fingerprint sensor, wherein if spoofing is detected, the method terminates, and/or recording image data via an optical sensor of the authentication device, which is preferably a camera, wherein preferably an anti-spoofing check of the recorded biometric identification data is performed, by an anti-spoofing-engine of the authentication device or of the optical sensor, wherein if spoofing is detected, the method terminates, and/or recording voice data via a microphone of the authentication device, wherein preferably an anti-spoofing check of the recorded voice data is performed, by an anti-spoofing-engine of the authentication device or of the microphone, wherein if spoofing is detected, the method terminates, and/or recording vein data via an optical vein detection sensor of the authentication device, wherein preferably an anti-spoofing check of the recorded vein data is performed, by an anti-spoofing-engine of the authentication device or of the optical vein detection sensor, wherein if spoofing is detected, the method terminates.

According to embodiments of the present disclosure, the authentication method may provide that in determining one of the at least one mobile device which is within a recording zone further comprises the consideration of an intent indication information, the intent indication information representing the intent of a carrier person of the at least one mobile device to interact with the authentication device, wherein the intent indication information comprises one or more of the following:

position of the carrier person, obtained through Ultra-Wideband transmissions between the at least one mobile device and the authentication device and/or through optical sensor data which is preferably obtained by a camera, moving speed of the carrier person, obtained through Ultra-Wideband transmissions between the at least one mobile device and the authentication device and/or through optical sensor data which is preferably obtained by a camera, moving direction of the carrier person, obtained through Ultra-Wideband transmissions between the at least one mobile device and the authentication device and/or through optical sensor data, which is preferably obtained by a camera, viewing direction of the carrier person, obtained through optical sensor data which is preferably obtained by a camera, pose information, in particular orientation of extremities of the carrier person, obtained through optical sensor data which is preferably obtained by a camera, gestures of the carrier person, obtained through optical sensor data which is preferably obtained by a camera.

Further, detecting an individual among other objects, in particular distinguishing between individuals and non-individuals, may be carried out based on the shape of a detected object. The shape of the detected objects can be analyzed to detect the presence of certain predefined characteristics that indicate that the object is an individual. The shape may alternatively or additionally be compared with a shape database, while the shape database contains a set of different shapes of individuals or predefined shape characteristics. The shape database may be trained via machine learning. Further, the detection of an individual may be carried out or supported by means of artificial intelligence.

Extracting pose information of a detected individual may be carried out in particular via a recognition of the position, orientation and/or movement of the body extremities. In other words, extracting pose information may be based on the real time characteristics of the skeleton of the individual. The skeleton of a detected individual can be recognized, for example, via matching with a pattern database which may be trained via machine learning, or recognized by means of artificial intelligence.

Extracting viewing direction information of a detected individual may be carried out in particular via a recognition of the orientation and/or movement of the head and/or eyes. In other words, extracting viewing direction information may be based on the real time orientation and/or movement of the head of the individual which includes the respective eyes. The viewing direction may be approximated considering on the one hand the orientation and/or movement of characteristic parts of the head, for instance the nose and/or the forehead and/or the chin and/or eye sockets. On the other hand, in order to obtain a more precise viewing direction information, the eyeball and its features, for instance the pupil, may be detected. The extraction of viewing direction information may be carried out via matching with a head-eye database which may be trained via machine learning. Further, the extraction of viewing direction information may be carried out or supported by means of artificial intelligence.

Preferably it is provided that the pose information includes motion of pose of the respective individual and/or viewing direction information includes motion of viewing direction of the respective individual.

Considering the motion of pose and/or viewing direction is a further valuable indication for determining the intention of a respective individual. The consideration of this data thus increases the accuracy of the provided method.

The position of extremities may for example comprise the direction in which toes of respective feet of the individual are pointing, is one of the most valuable characteristics of the skeleton for estimating the direction in which an individual is facing. The information is an especially useful indicator for determining that an individual is at all considering requesting access.

Further, in order to enhance the precision of the intent determination, a first set of intent indication information and a second set of intent indication information may be at least partially mutually associated, wherein an inconsistency detection loop is performed on the basis of the associated intent indication information for detecting and preferably rectifying the detected intent indication information. Advantageously, information about the direction in which toes of respective feet of the individual are pointing may for example be used to verify if the detection of, e. g. the viewing direction is correct. If needed, the intent determination can be rectified automatically.

According to various embodiments of the present disclosure, the authentication method may provide that before sending the recorded biometric identification data to the determined mobile device, the recorded biometric identification data is preprocessed and/or encrypted and only the preprocessed and/or encrypted recorded biometric identification data is sent to the determined mobile device.

By providing encryption, the security level of the present disclosure in terms of data privacy is enhanced. Further, encryption may facilitate to comply with data protection regulations depending on the common law. In addition, or alternatively, the authentication device may perform preprocessing on the recorded biometric identification data.

Preprocessing may preferably comprise one or more of the following: Region-of-Interest (ROI) data cropping; Volume-of-Interest (VOI) data cropping in case a 3D-camera, in particular a depth camera such as an Intel RealSense camera is used; data resolution adaption; meta-data adding, wherein the meta-data may comprise a time stamp and/or an ID of the authentication device and/or information about the location of the authentication device. Particularly preferably preprocessing may result in creating a template.

Preprocessing of the biometric identification data may be particularly advantageous from several points of view:

On the one hand, person's interest in disclosing only as much as necessary but as little as possible of sensitive data can be considered. For example, for this purpose Region-of-Interest (ROI) data cropping and/or Volume-of-Interest (VOI) data cropping may be performed. In particular, for Region-of-Interest (ROI) data cropping in case of face recognition, literally speaking, the biggest face may be chosen because it is likely that this is the face of the nearest person. Additionally, upon installation of the system, it may be predefined in which spot the face should be before image capturing is activated. Therefore, the authentication device may give feedback to a person to place himself or his face in a specific area.

On the other hand, it may be a particular benefit if preprocessing is performed according to a detected type of mobile device in order to facilitate the mobile device to efficiently compare the biometric identification data with the stored template. Preprocessing can therefore be performed individually according to the mobile device type.

Further, as a general aspect, network traffic can be reduced if the biometric identification data has been reduced to the essentials by the above-mentioned preprocessing actions.

According to further embodiments of the present disclosure, the authentication method may provide that after receiving credential data from the determined mobile device, verifying the credential data is performed by the authentication device, wherein the received credential data is cross-checked with a credential whitelist and/or with predefined authentication rules, wherein the credential whitelist and/or predefined authentication rules are stored in a remote server with which the authentication device communicates or are stored on a local memory of the authentication device, and wherein the authentication method preferably further comprises outputting an authentication signal which is particularly preferably an opening signal to a lock.

Additionally, it may be provided that verifying the credential data comprises:
creating a trust label, by the authentication device, the trust label being associated with the determined mobile device for getting access, in particular, to one or more sub-assets, wherein the access to the one or more sub-assets is controlled by respective one or more secondary authentication devices, wherein preferably the trust label may also be detected by the authentication device for granting access without the use of biometric identification data.

Additionally, it may be provided:
sending the trust label, by the authentication device, to the one or more secondary authentication devices of the respective sub-assets such that based on the trust label, the one or more secondary authentication devices may grant access to the respective sub-assets without a further recording of biometric identification data of the carrier person, wherein the trust label is preferably only valid for a predetermined time period, or
sending the trust label, by the authentication device, to the determined mobile device enabling the determined mobile device and its carrier person to get access to the respective sub-assets without a further recording of biometric identification data of the carrier person, wherein the trust label is preferably only valid for a predetermined time period.

The use of trust labels is particularly advantageous for buildings with several access points within the building. In this case, the required investment is very high if an authentication device with all the functionalities for carrying out the method according to the present disclosure is provided at each access point. By using a trust label, the investment requirement can be reduced in an advantageous manner by performing authentication according to the present disclosure at one point and ensuring that the completed authentication also remains valid for other access points. For example, authentication can take place at a building's outer shell, whereby after authentication, access within the building is checked again at other access points with security requirements, but without the need for a check of biometric data. As mentioned above, the authentication device may perform a trust label check routine before running a biometric identification, wherein if a valid trust label is detected, no biometric authentication is performed, in particular, biometric authentication is waived. In business buildings which is left by employees, e. g. during lunchtime, entering the building may be possible without a further biometric authentication in order to facilitate quick and easy entrance.

A trust label may be valid for or at a predetermined time and/or in a predetermined area. It may be revoked automatically it a time limit expires and/or a predetermined area is left. By defining revocation rules, the security level may be defined according to particular needs.

According to various embodiments of the present disclosure, the authentication method may provide that after receiving authentication confirmation data from the determined mobile device, outputting an authentication signal is performed by the authentication device, wherein the authentication signal is preferably an opening signal to a door and/or lock.

According to further embodiments, the authentication method may only be performed, if a predetermined rule is met, wherein the predetermined rule comprises at least one of the following:
  authentication may only be performed within a predefined time period or at predefined times;
  authentication may only be performed if a predefined period of time has previously elapsed without authentication;
  authentication may only be performed if the authentication device has previously been set to an activated state by an activation device;
  authentication may only be performed if the authentication device has previously been set to an activated state by an activation device.

The possibility of linking access to further conditions or not performing authentication for certain conditions increases the variability and flexibility of the authentication method disclosed herein.

It may be further provided that the method comprises providing a fallback-authentication function, wherein an input of a carrier person is, which is preferably a RFID transmission and/or the input of a pin code, is received and processed for authentication of the carrier person.

According to a second aspect of the present disclosure, an authentication device, in particular an access control reader, is provided, which is configured to perform an authentication method according to the first aspect of the present disclosure.

According to a third aspect of the present disclosure, a computer program product is provided, comprising instructions which, when the program is executed by a computer, preferably by an authentication device, cause the computer, preferably the authentication device, to carry out a method according to the first aspect of the present disclosure.

All technical implementation details and advantages described with respect to the first aspect of the present disclosure, are self-evidently mutatis mutandis applicable for the second and third aspect of the present disclosure.

BRIEF DESCRIPTION OF THE DRAWINGS

The present disclosure will be explained in more detail, by way of example, with reference to the drawings as follows.

DETAILED DESCRIPTION OF THE DRAWINGS

Figure 1:
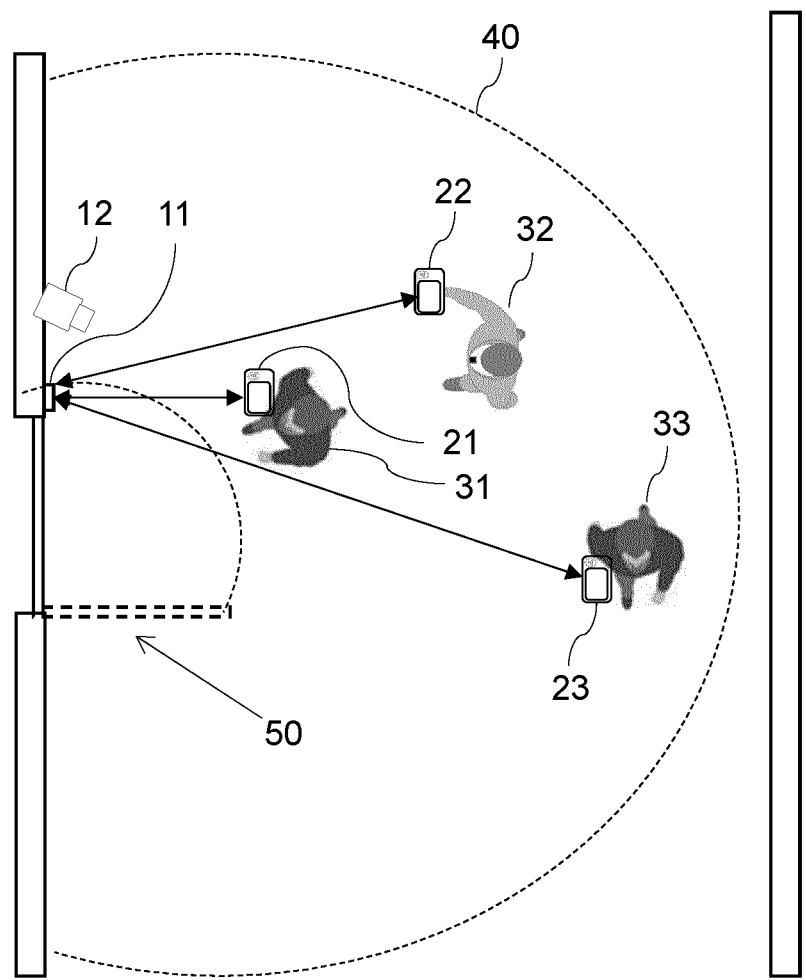
FIG. 1 shows a highly schematic perspective view of embodiments according to the present disclosure.

As can be seen by FIG. 1 which shows a highly schematic perspective view of embodiments according to the present disclosure, it is illustrated a situation in which three persons 31, 32, 33 are located in a building near a door 50, in particular inside a recording zone 40 of an authentication device 11 according to embodiments of the present disclosure. Each of the three persons 31, 32, 33 have a mobile device 21, 22, 23 which may be enabled to communicate via ultra-wideband. Each of the mobile devices 21, 22, 23 may have stored biometric identification data, preferably in the form of biometric templates, of the respective person 31, 32, 33, who is the respective carrier person 31, 32, 33 of the respective mobile device 21, 22, 23 in a local storage. Alternatively, of course, the biometric identification data may be stored remotely on a secure server with which the respective mobile device 21, 22, 23 may communicate, e.g. via a mobile communication network.

The biometric identification data may be already recorded previously via standard sensors of the mobile devices 21, 22, 23, for example being face templates, fingerprint templates or the like. Each of the three illustrated mobile devices 21, 22, 23 and respective carrier persons 31, 32, 33 are located inside the recording zone 40, but each having a different distance to the authentication device 11. The distance between the respective mobile devices 21, 22, 23 and the authentication device 11 is depicted by arrows in FIG. 1.

The authentication device 11 is mounted on a wall near the door 50, the door 50 having a lock for securing an asset, for example specific parts or rooms in a building. The authentication device 11 may comprise an antenna, in particular an antenna array capable of communicating via ultra-wideband, such that the authentication device 11 is capable of communicating with respective mobile devices 21, 22, 23 in order to measure the distance from the mobile device 21, 22, 23 to itself and send and receive data such as image data and/or credential data. In particular, the authentication device 11 may provide ranging via ultra-wideband through ultra-wideband transmissions with respective mobile devices 21, 22, 23.

The authentication device may use one or more camera(s) 12 for additionally detecting the position of the respective carrier persons 31, 32, 33 inside the recording zone 40. The camera 12 may be a separate device, as depicted in FIG. 1, or of course may be integrated in the authentication device 11. The person skilled in the art of course fully understands that the authentication device 11 may also use a camera array, and in particular more than one camera 12, in order to determine the positions of the carrier persons 31, 32, 33. The camera 12 or the plurality of cameras 12 may be depth cameras, such as Intel RealSense depth cameras, preferably using an infrared sensor.

The authentication device 11 may comprise a sensor, which may be particularly an optical sensor, for detecting biometric identification data of the carrier persons 31, 32, 33. The sensor, in case it is an optical sensor, may of course be the same camera 12 as described in the paragraph above. In other words, the authentication device 11 may use the camera 12 as depicted in FIG. 1, for determining the position of the respective carrier persons 31, 32, 33 in the recording zone 40 as well as for capturing the biometric identification data, such as images from the face of the carrier persons 31, 32, 33.

The recording zone 40, as it is depicted in the embodiment of FIG. 1, may be provided to be in the near environment of the authentication device 11. For example, the recording zone 40 may be a semicircular area on one side of an access portal or door 50 near which the authentication device 11 is mounted. In particular, the recording zone 40 may be a zone in which the authentication device 11 is capable of recording position data of persons and/or biometric authentication data of a carrier person, for example through a camera. Of course, the recording zone may be defined to be as small such that only a predefined number of persons 31, 32, 33 in able to be in inside the recording zone 40.

Based on the setting illustrated in FIG. 1, the methods according one embodiment of the present disclosure may be carried out as follows.

At first, the authentication device 11 may obtain position data from the mobile devices 21, 22, 23 via ultra-wideband transmissions. The position data is respectively an indicator for the position of the respective mobile device 21, 22, 23 relative the authentication device 11. Of course, in this case the authentication device 11 as well as the mobile devices 21, 22, 23 are configured to communicate via ultra-wideband.

In a second step, the authentication device 11 may determine one of the mobile devices 21, 22, 23 which is within a recording zone 40 being the "nearest" relative to the authentication device 11. In the present illustration, all three mobile devices 21, 22, 23 are located inside the recording zone 40. This is the case, since the recording zone 40 as depicted in FIG. 1, is defined to be a large recording zone 40, it is necessary to determine the one mobile device 21, 22, 23 for granting access which is the "nearest" relative to the authentication device 11. Thus, the authentication device 11 chooses the mobile device 21 which is the nearest in terms of distance to the authentication device 11 to be the one determined mobile device 21. Of course, the recording zone 40 can also be defined to be very small, such that only one carrier person 31, 32, 33 and carrier person 31, 32, 33 can be located inside the recording zone 40. In such case, the determination of the nearest mobile device 21, 22, 23 is not necessary.

After determining the one mobile device 21 to which it should potentially be granted access, the authentication device 11 obtains position data of the persons 31, 32, 33 inside the recording zone 40. The position data of the persons 31, 32, 33 is then correlated to the position data of the mobile devices 21, 22, 23, such that it can be determined that one of the persons 31, 32, 33 is the carrier person 31 of the determined mobile device 21. In other words, two different layers of position data are correlated to each other, the first layer being the layer of the position of the mobile devices 21, 22, 23, and the second layer being the layer the positions of the persons 31, 32, 33. This is for matching the persons 31, 32, 33 and the mobile devices 21, 22, 23 correctly.

In a further step, the authentication device 11 may record biometric identification data of the determined carrier person 31 of the determined mobile device 21, such as images from the face of the carrier person 31. This may be carried out using the camera or a separate optical sensor which may be integrated in the authentication device 11.

Afterwards, preprocessing and encryption of the recorded biometric identification data may be performed, wherein the preprocessing in particular comprises: a region-of-interest (ROI) analysis for transforming the recorded data into a biometric template; anonymization of the recorded data for the sake of data privacy; compression of the recorded data such that the data traffic is reasonably reduced. On the other hand, the encryption may comprise for example an asymmetric encryption.

The preprocessed and/or encrypted recorded biometric identification data is then sent to the determined mobile device 21. Then, directly afterwards, the recorded biometric identification data may be deleted such that the information is not captured further in the authentication device 11.

The mobile device 21, after receiving the biometric identification data, may compare it to the respective templates stored locally or on a secure server to which the mobile device may be connected, such that the mobile device 21 can verify that the biometric identification data received from the authentication device 11 matches to the respective templates of the mobile device 21. If this verification was successful, the mobile device 21 may trigger sending credential data or authentication confirmation data to the authentication device 11.

The authentication device 11 may, in case it received credential data, then verify that the credential data matches to credential data on a whitelist stored locally or on a server to which the authentication device 11 is capable to communicate, and then, if the verification was successful, the authentication device 11 may output an authentication signal being an opening signal to a door 50 or to the lock of a door 50. In case the mobile device 21 sends the authentication device 11 an authentication confirmation data, the step of verifying the credential data is not provided, such that the authentication device 11 directly outputs an authentication signal being an opening signal to a door 50 to a lock of a door 50.

Figure 2:
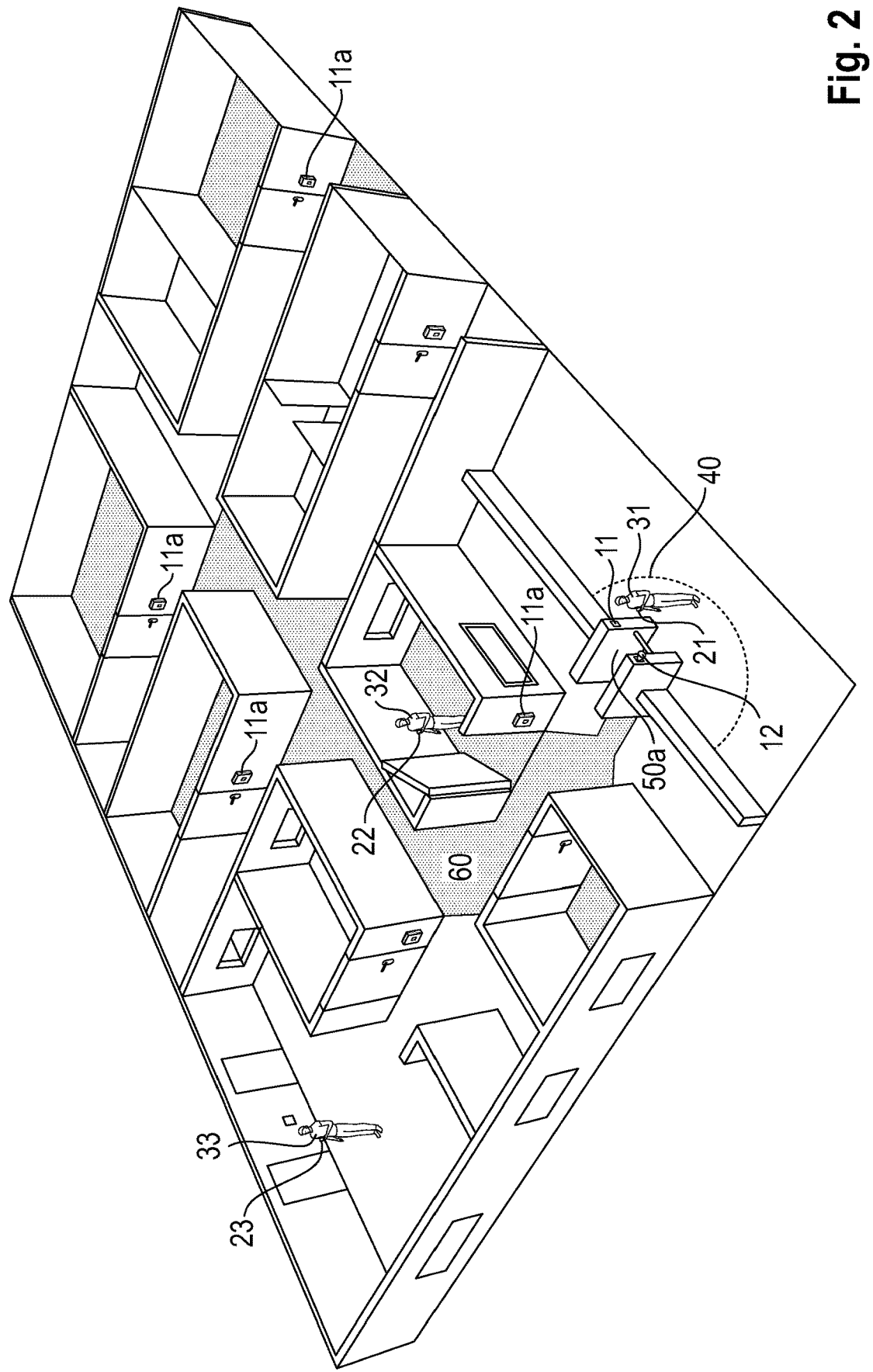
FIG. 2 shows highly schematic top view of a building having implemented an embodiment according to the present disclosure, illustrating the benefits of providing a trust label for seamless access control.

Referring to FIG. 2, it is illustrated a highly schematic top view of a building having implemented one embodiment according to the present disclosure.

At the main entry 50a of the building, a carrier person 31 of the mobile device 21 may authenticate via the method of the present disclosure, for example as described above, wherein it is further provided that the authentication device 11 at the main entry 50a of the building creates a trust label for the respective determined mobile device 21 of the carrier person 31. In other words, after verifying the credential data, as described above, the authentication device 11 further creates a trust label being associated with the determined mobile device 21 for getting access to one or more sub-assets.

The access to the one or more sub-assets may be controlled by respective secondary authentication devices 11a as depicted in FIG. 2. Further, FIG. 2 shows a trust area 60 in the building, wherein the trust area 60 is illustrated as a dotted floor for the sake of explanation. This trust area 60 may be understood as an area, in which the carrier person 31 with his mobile device 21 should be allowed to enter the respective sub-assets associated with the trust area 60. For this purpose, the authentication device 11 at the main entrance 50a sends the trust label to the respective secondary authentication devices 11a of the respective sub-assets such that based on the trust label, the secondary authentication devices 11a may grant access to the respective sub-assets without a further recording of biometric identification data of the carrier person 31. The secondary authentication devices 11a may in particular grant access based on a simple ID of the mobile device 21 or the like.

Alternatively, the trust label may be sent by the authentication device 11 to the determined mobile device 21 enabling the determined mobile device 21 and its carrier person 31 to get access to the respective sub-assets through the one or more secondary authentication devices 11a. In this case, the secondary authentication devices 11a may open based on the trust label which may be displayed and/or communicated to them from the mobile device 21. In each of both cases, it may be provided that the trust label is only valid for predetermined time periods.

The use of trust labels is particularly advantageous for buildings with several access points, as illustrated in FIG. 2. In such buildings, the required investment effort is very high if an authentication device 11 with all the functionalities for carrying out the method according to the present disclosure is provided at each access point. By using a trust label, the investment efforts can be reduced in an advantageous manner by performing authentication according to the present disclosure at one point and ensuring that the completed authentication also remains valid for other access points.

Figure 3:
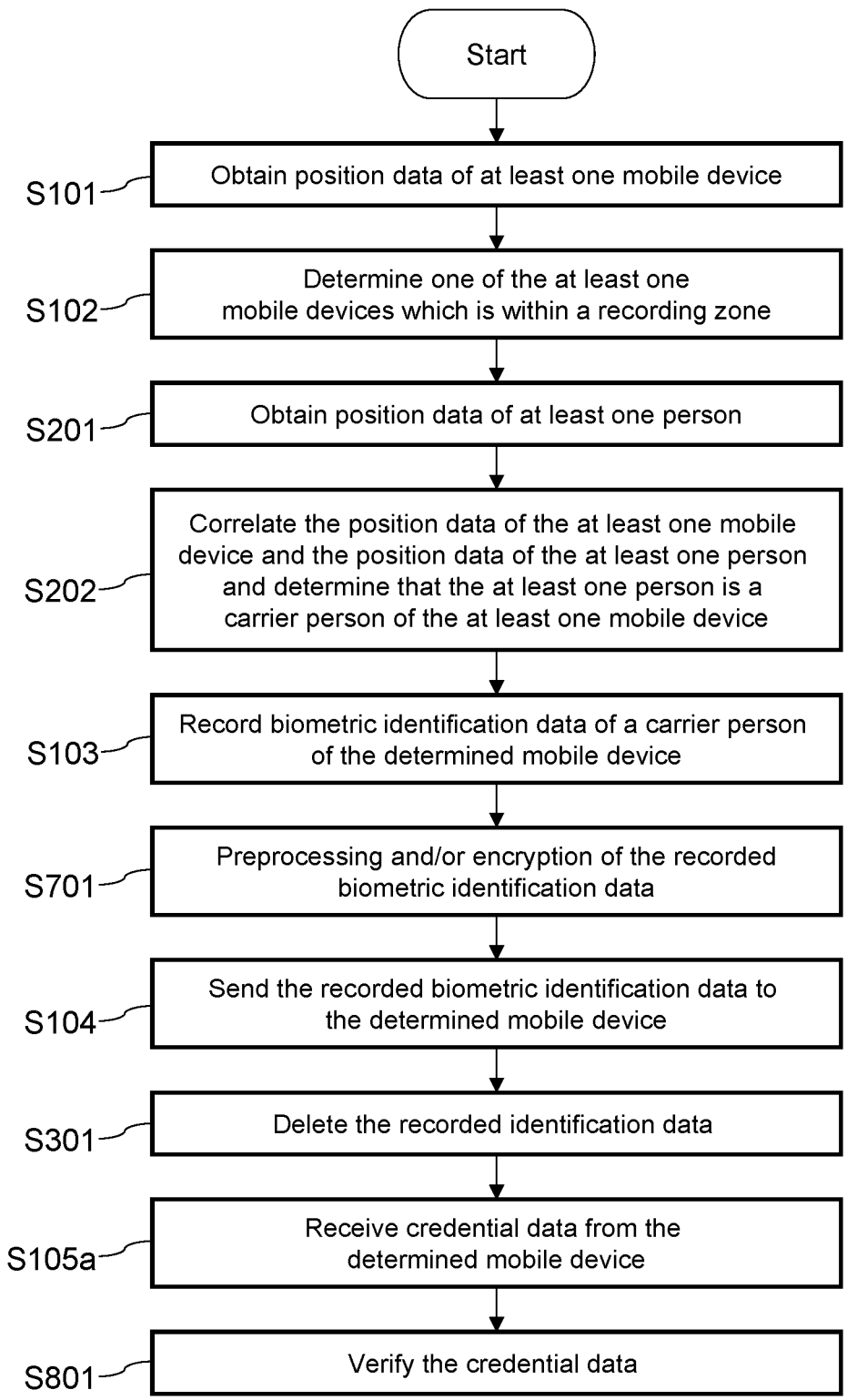
FIG. 3 is a first flow chart diagram illustrating exemplary steps of embodiments according to the present disclosure.
Figure 4:
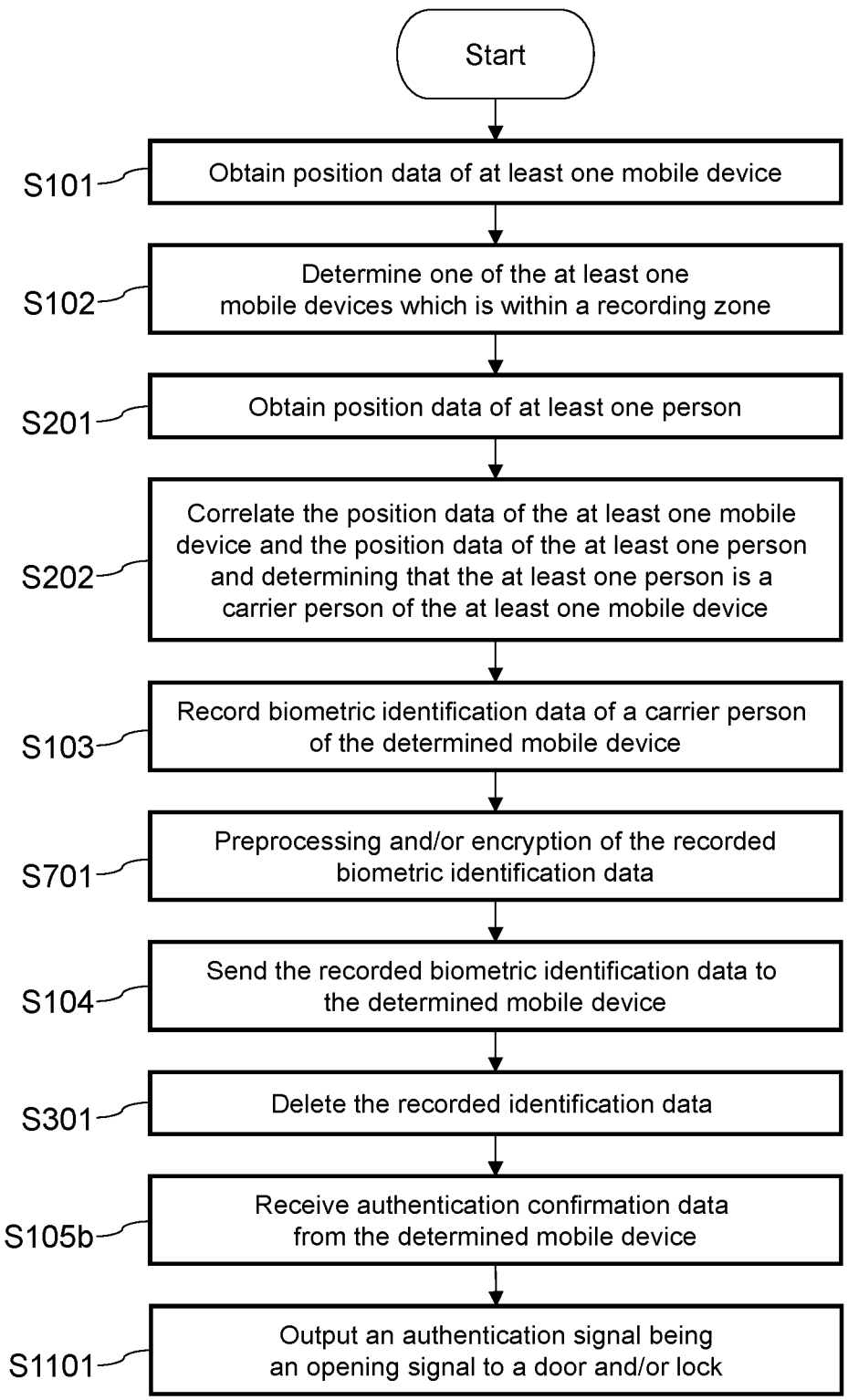
FIG. 4 is a second flow chart diagram illustrating exemplary steps of embodiments according to the present disclosure.

FIGS. 3 and 4 show exemplary flow charts of two possible embodiments according to the present disclosure. Apart from the last two steps, all steps are the same, described as follows:

In step S101, the authentication device obtains position data of at least one mobile device. In step S102, the authentication device determines one of the at least one mobile devices which is within a recording zone. In step S201, the authentication device obtains position data of at least one person. In step S202, the authentication device correlates the position data of the at least one mobile device and the position data of the at least one person and determines that the at least one person is a carrier person of the at least one mobile device. In step S103, the authentication device records biometric identification data of a carrier person of the determined mobile device. In step S701, the authentication device performs preprocessing and/or encryption of the recorded biometric identification data. In step S104, the authentication device sends the recorded biometric identification data to the determined mobile device. In step S301, the authentication device deletes the recorded identification data.

In step S105a according to FIG. 3, the authentication device receives credential data from the determined mobile device. Alternatively, in step S105b according to FIG. 4, the authentication device receives authentication confirmation data from the determined mobile device.

In step S801 according to FIG. 3, the authentication device verifies the credential data. Alternatively, in step S1101 according to FIG. 4, the authentication device outputs an authentication signal being an opening signal to a door and/or lock.

In the following, exemplary short use-case scenarios are mentioned in which an embodiment of the present disclosure may be used:

A first use case is access management in buildings, and the present disclosure can be applied to any type of building. Particularly preferred are office buildings, hotels and multi-housing buildings.

A second use case is travel hubs, for example passenger stations and airports. Here, people can be checked with the assistance of the present disclosure in a particularly convenient, time-saving and at the same time secure manner.

A third use case is high security areas, such as government or military sites or sensitive research facilities. The present disclosure can significantly contribute to increasing security against unauthorized access and provide access to authorized persons in a simple convenient manner.

A fourth use case is the opening of cars. This use case is particularly easy to implement, since modern cars already have camera systems and, for example, ultra-wideband antennas. The legitimate owner of the car can enter and use the car using the method according to the disclosure. If he wants to grant access to third parties, for example friends or people from his family, he can do this either by temporarily deactivating biometric authentication and electronically transmitting/granting access authorization to the corresponding person; or by registering the person, who can then also authenticate himself biometrically using the method according to the disclosure; or by handing over the physical key to the car, which can be useful in particularly unexpected urgent cases. The physical key, in this sense, overrules the authentication by means of the method according to the disclosure. This can therefore be seen as a backup solution in this sense.

A fifth use case is the execution of payments, for example at supermarket checkouts, ticket counters, among others.

The mentioned use cases have been listed for the sake of comprehensibility and illustration and are in no way to be understood as limiting the subject matter of the present disclosure.

The invention claimed is:

1. An authentication method, in particular an access control method, for trusted seamless authentication, for granting trusted seamless access to an asset, comprising:
    obtaining, by an authentication device, position data of at least one mobile device, the position data of the at least one mobile device being indicative for the position of the at least one mobile device relative to the authentication device,
    determining, by the authentication device, one mobile device of the at least one mobile device which is within a recording zone,
    recording, by the authentication device, biometric identification data of a carrier person of the determined mobile device,
    sending, by the authentication device, the recorded biometric identification data to the determined mobile device, and receiving, in response to sending the recorded identification data, by the authentication device, authentication confirmation data and/or credential data from the determined mobile device, wherein, in addition to obtaining position data of at least one mobile device, the method further comprises:

obtaining, by the authentication device, position data of at least one person, using at least one optical sensor which may be a camera, the position data of the at least one person being indicative for the position of the at least one person relative to the authentication device, correlating of the position data of the at least one mobile device and the position data of the at least one person and determining that the at least one person is a carrier person of the at least one mobile device to grant trusted seamless access to an asset, wherein after receiving credential data from the determined mobile device, verifying the credential data is performed by the authentication device, wherein the received credential data is cross-checked with a credential whitelist and/or with predefined authentication rules, wherein the credential whitelist and/or predefined authentication rules are stored in a remote server with which the authentication device communicates or are stored on a local memory of the authentication device, and wherein the authentication method further comprises outputting an authentication signal which is an opening signal to a lock, wherein verifying the credential data comprises creating a trust label, by the authentication device, the trust label being associated with the determined mobile device for getting access to one or more sub-assets, wherein the access to the one or more sub-assets is controlled by respective one or more secondary authentication devices, wherein the trust label may also be detected by the authentication device for granting access without the use of biometric identification data.

2. The authentication method of claim 1, comprising deleting, by the authentication device, the recorded identification data after sending the recorded identification data to the determined mobile device.

3. The authentication method of claim 1, wherein obtaining position data of at least one mobile device is performed by means of Ultra-Wideband transmissions and/or by means of Bluetooth transmissions and/or by means of Wireless-LAN transmissions and/or by means of GPS data provided by the at least one mobile device and/or by means of geomagnetic indoor positioning data provided by the at least one mobile device.

4. The authentication method of claim 1, wherein recording biometric identification data of a carrier person of the determined mobile device comprises recording sensor data, wherein the sensor data may be also recorded and stored by a smartphone by default:

recording a fingerprint via a fingerprint sensor of the authentication device, wherein an anti-spoofing check of the recorded biometric identification data is performed, by an anti-spoofing-engine of the authentication device or of the fingerprint sensor, wherein if spoofing is detected, the method terminates, and/or recording image data via an optical sensor of the authentication device, which is a camera, wherein an anti-spoofing check of the recorded biometric identification data is performed, by an anti-spoofing-engine of the authentication device or of the optical sensor, wherein if spoofing is detected, the method terminates, and/or recording voice data via a microphone of the authentication device, and/or recording vein data via an optical vein detection sensor of the authentication device.

5. The authentication method of claim 1, wherein in determining one of the at least one mobile device which is within a recording zone further comprises the consideration of an intent indication information, the intent indication information representing the intent of a carrier person of the at least one mobile device to interact with the authentication device, wherein the intent indication information comprises one or more of the following:

position of the carrier person, obtained through Ultra-Wideband transmissions between the at least one mobile device and the authentication device and/or through optical sensor data which is obtained by a camera, moving speed of the carrier person, obtained through Ultra-Wideband transmissions between the at least one mobile device and the authentication device and/or through optical sensor data which is obtained by a camera, moving direction of the carrier person, obtained through Ultra-Wideband transmissions between the at least one mobile device and the authentication device and/or through optical sensor data, which is obtained by a camera, viewing direction of the carrier person, obtained through optical sensor data which is obtained by a camera, orientation of extremities of the carrier person, obtained through optical sensor data which is obtained by a camera, gestures of the carrier person, obtained through optical sensor data which is obtained by a camera.

6. The authentication method of claim 1, wherein before sending the recorded biometric identification data to the determined mobile device, the recorded biometric identification data is preprocessed and/or encrypted and only the preprocessed and/or encrypted recorded biometric identification data is sent to the determined mobile device.

7. The authentication method of claim 1, further comprising:

sending the trust label, by the authentication device, to the one or more secondary authentication devices of the respective sub-assets such that based on the trust label, the one or more secondary authentication devices may grant access to the respective sub-assets without a further recording of biometric identification data of the carrier person, wherein the trust label is only valid for a predetermined time period, or sending the trust label, by the authentication device, to the determined mobile device enabling the determined mobile device and its carrier person to get access to the respective sub-assets without a further recording of biometric identification data of the carrier person, wherein the trust label is only valid for a predetermined time period.

8. The authentication method of claim 1, wherein after receiving authentication confirmation data from the determined mobile device, outputting an authentication signal is performed by the authentication device, wherein the authentication signal is an opening signal to a door and/or lock.

9. The authentication method of claim 1, wherein the method is only performed, if a predetermined rule is met, wherein the predetermined rule comprises at least one of the following:

authentication may only be performed within a predefined time period or at predefined times;

authentication may only be performed if a predefined period of time has previously elapsed without authentication;

authentication may only be performed if the authentication device has previously been set to an activated state by an activation device;

authentication may only be performed if the authentication device has previously been set to an activated state by an activation device.

10. The authentication method of claim 1, wherein the method comprises providing a fallback-authentication function, wherein an input of a carrier person is, which is a RFID transmission and/or the input of a pin code, is received and processed for authentication of the carrier person.

11. An authentication device which is configured to perform the authentication method according to claim 1.

12. A computer program product comprising instructions which, when the program is executed by an authentication device, cause the authentication device, to carry out the method of claim 1.

13. An authentication method, in particular an access control method, for trusted seamless authentication, for granting trusted seamless access to an asset, comprising:

obtaining, by an authentication device, position data of at least one mobile device, the position data of the at least one mobile device being indicative for the position of the at least one mobile device relative to the authentication device, determining, by the authentication device, one mobile device of the at least one mobile device which is within a recording zone, recording, by the authentication device, biometric identification data of a carrier person of the determined mobile device, sending, by the authentication device, the recorded biometric identification data to the determined mobile device, and receiving, in response to sending the recorded identification data, by the authentication device, authentication confirmation data and/or credential data from the determined mobile device, wherein after receiving credential data from the determined mobile device, verifying the credential data is performed by the authentication device, wherein the received credential data is cross-checked with a credential whitelist and/or with predefined authentication rules, wherein the credential whitelist and/or predefined authentication rules are stored in a remote server with which the authentication device communicates or are stored on a local memory of the authentication device, and wherein the authentication method further comprises outputting an authentication signal which is an opening signal to a lock, wherein verifying the credential data comprises creating a trust label, by the authentication device, the trust label being associated with the determined mobile device for getting access to one or more sub-assets, wherein the access to the one or more sub-assets is controlled by respective one or more secondary authentication devices, wherein the trust label may also be detected by the authentication device for granting access without the use of biometric identification data.

* * * * *